No. 736,908. PATENTED AUG. 18, 1903.
C. WRIGHT.
HOSE COUPLING.
APPLICATION FILED SEPT. 11, 1902.
NO MODEL.
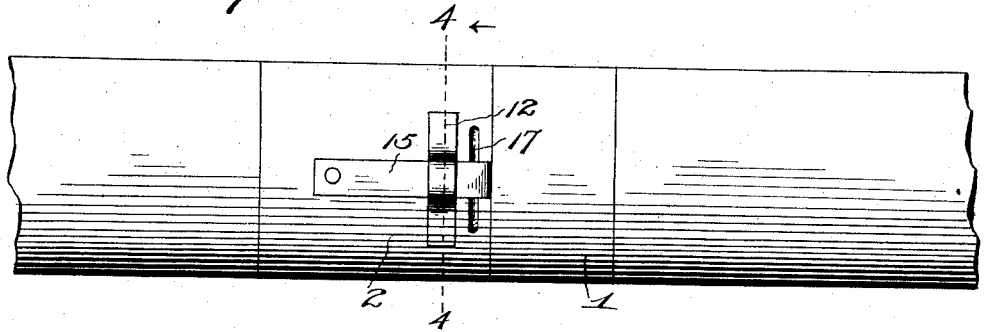
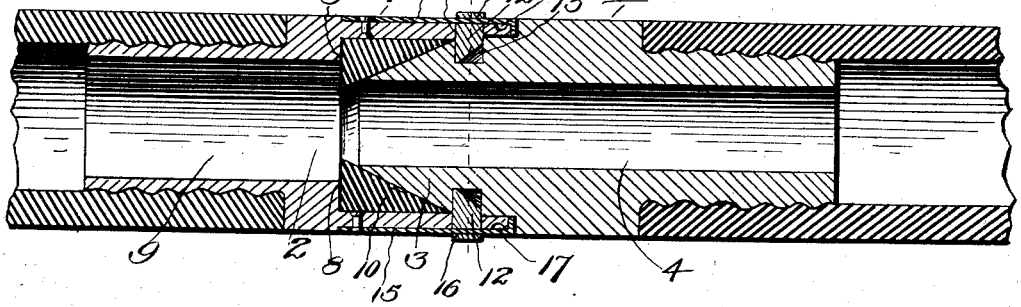
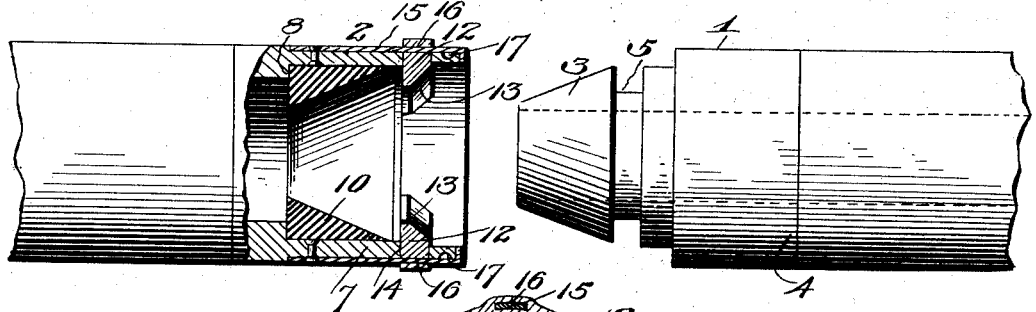
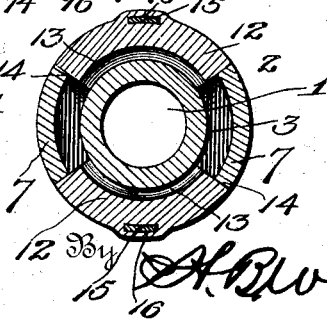
Witnesses
C. E. Hunt.
George Thom
Inventor
Charles Wright.
By H. B. Willson & Co.
Attorneys No. 736,908. Patented August 18, 1903.

UNITED STATES PATENT OFFICE.

CHARLES WRIGHT, OF EVERSON, PENNSYLVANIA, ASSIGNOR OF ONE-HALF TO JAMES J. O'SHEA, OF EVERSON, PENNSYLVANIA

HOSE-COUPLING.

SPECIFICATION forming part of Letters Patent No. 736,908, dated August 18, 1903.

Application filed September 11, 1902. Serial No. 123,021. (No model.)

*To all whom it may concern:*

Be it known that I, CHARLES WRIGHT, a citizen of the United States, residing at Everson, in the county of Fayette and State of Pennsylvania, have invented certain new and useful Improvements in Hose-Couplings; and I do declare the following to be a full, clear, and exact description of the invention, such as will enable others skilled in the art to which it appertains to make and use the same.

The invention relates to improvements in hose-couplings, the object being to produce a coupling which can be easily and quickly coupled or uncoupled and which when coupled will form a fluid-tight joint.

A further object is to provide such a coupling which will be simple in construction, strong and durable in use, inexpensive of production, and well adapted to the use for which it is designed.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a side elevation of the coupling, showing the parts coupled. Fig. 2 is a longitudinal vertical section of the same. Fig. 3 is a similar view showing the parts uncoupled. Fig. 4 is a cross-sectional view on the line 4 4 of Fig. 1.

In the drawings, 1 denotes the male member, and 2 the female member, of the coupling, which are adapted to be inserted one within the other to form a tight union.

The male member of the coupling consists of a frusto-conical-shaped head 3 and a shank 4, to which the end of a hose is adapted to be attached in the ordinary or any approved manner. Between the head 3 and shank 4 is formed an annular groove or channel 5, the purpose of which will presently appear. The male member of the coupling is further provided with a central longitudinal bore or opening 6.

The female member of the coupling consists of a cylindrical shell 7, provided with a bore terminating in a shoulder 8 near its point of junction with the hose-attaching shank 9, the shoulder 8 being formed by the bore of the shank 9, which is of slightly less diameter than the bore of the shell 7.

10 denotes a rubber washer or gasket, which is seated within the bore of the shell 7 and limited in its backward movement by the shoulder 8 and is provided with a tapering or conical-shaped hole, which is adapted to receive the frusto-conical end or head of the male member of the coupling. It will be noticed that the hole or opening through the washer 10 tapers to the outer edge of the washer at one end, and the hole being considerably smaller at the opposite end will form a comparatively large bearing-surface between its edge and the outer edge of the washer, and when the washer is seated in the shell of the female member of the coupling this surface will be presented to the pressure of the water passing through the hose, which will tend to force the washer more tightly between the head of the male member of the coupling and the shell of the female member, thereby forming an absolutely tight joint.

12 denotes locking-blocks consisting of segmental-shaped pieces, the outer faces of which are beveled, as shown at 13. The blocks are preferably, though not necessarily, two in number, and are adapted to be seated in slots or recesses 14, formed through the side walls of the shell 7 at diametrically opposite points, and are held in position by means of flat leaf-springs 15, riveted at one end to the shell and passing through slots 16, formed in the said blocks and having their ends bent inwardly at the end of the shell 7, the springs 15 being countersunk in grooves formed in the shell, so that no obstructions will be formed on the outer surface of the shell. When the parts of the coupling are brought together, the conical head of the male member will engage the beveled faces of the blocks 12 and force the same outwardly, causing them to ride over said head and to snap down behind the same into the annular groove or channel 5, formed at the rear of said head, and thereby hold the same into close contact with the washer 10.

17 denotes a transverse groove formed in the outer surface of the shell 7 immediately beneath the forward end of the springs 15 and into which is adapted to be inserted a suitable tool to raise the springs and withdraw said blocks and allow the parts to be uncoupled.

From the foregoing description, taken in connection with the accompanying drawings, it is thought that the construction, operation, and advantages of my improved hose-coupling will be readily apparent without requiring a more extended explanation, and it will be seen that I have produced a hose-coupling which can be instantaneously coupled and which cannot accidentally become loose or uncoupled and which may be used in connection with any hose, and where a quickly-coupled union is desired it will be found a great advantage.

Various changes in the form, proportion, and the minor details of construction may be resorted to without departing from the principle or sacrificing any of the advantages of this invention.

Having thus described my invention, what I claim as new, and desire to secure by Letters Patent, is—

A hose-coupling comprising a member having a projecting head and an annular groove thereon, a member adapted to receive the said head and having transverse radial openings, to register with the groove, longitudinal, external countersinks, notches at its end coincident with the outer ends of the countersinks, and transverse grooves 17 deeper than the countersinks and extending across them, radially-movable blocks in said openings, adapted to enter the groove of the head, and flat springs in the countersinks, secured at their inner ends, attached to the blocks, and having their outer, free ends inturned and disposed to enter the notches at said ends of the countersinks, substantially as described.

In testimony whereof I have hereunto set my hand in presence of two subscribing witnesses.

CHARLES WRIGHT.

Witnesses:
  HARRY LAUGHREY,
  JAMES J. O'SHEA.